April 8, 1930.  L. F. WHITNEY  1,753,676
TEMPERATURE REGULATOR
Filed March 10, 1927
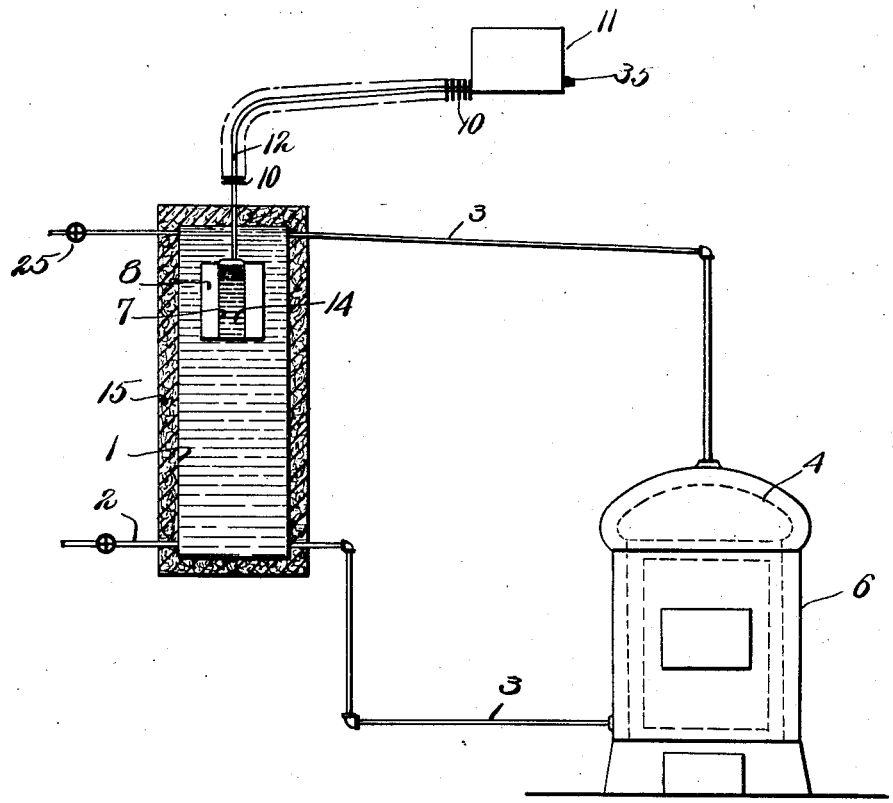
Inventor
Lyman F. Whitney
by Roberts Cushman & Woodbury
Attorneys Patented Apr. 8, 1930

1,753,676

UNITED STATES PATENT OFFICE

LYMAN F. WHITNEY, OF BOSTON, MASSACHUSETTS, ASSIGNOR, BY MESNE ASSIGN-MENTS, TO STATOR REFRIGERATION, INC., A CORPORATION OF DELAWARE

TEMPERATURE REGULATOR

Application filed March 10, 1927. Serial No. 174,212.

This invention relates to an automatic temperature control device which, without use of moving mechanical parts, prevents the temperature of a body from rising above a predetermined maximum and yet does not interfere with the imparting of heat to the body. This device does not appreciably affect the thermal condition of the body until the latter closely approaches the predetermined maximum temperature, whereupon heat may be dissipated as rapidly as it is supplied to the body, so that no further material increase in the temperature thereof occurs even under maximum conditions of heat input.

A device of this character is adapted to be used in conjunction with a liquid supply system which may be constantly receiving heat from any source and from which liquid may be removed at irregular intervals and in varying amount so that the relation between heat input and heat emitted with the liquid varies widely. For example, in a hot water storage system for household use which is heated by a water coil in a stove, furnace, or the like, it is desirable or necessary to continue imparting heat to the storage system while different amounts of water may be removed from the system at irregular intervals. When hot water is infrequently withdrawn from systems of this character, the water temperature is likely to be excessively high, while, under conditions of frequent water withdrawal, the water may not have an opportunity to become adequately heated; in any case a considerable amount of heat is lost to the air surrounding the water tank. The present device not only prevents the water temperature from exceeding a predetermined maximum, even when the maximum amount of heat is being imparted to the system and no water is being withdrawn, but also permits this advantageous result with an insulated storage tank from which thermal losses due to heat radiation are minimized; so that, with a given heat input, a larger supply of hot water is available, when desired. Furthermore, this temperature control device does not involve use of moving parts such as automatic valves, thermostats, or the like, nor does it necessitate any waste of water.

The above and further objects and advantages of this invention will be apparent to those skilled in the art upon a reading of the subjoined description and claims in conjunction with the accompanying drawing, in which:

The figure is a diagrammatic view of the improved heat control device as applied to a hot water storage system.

The accompanying drawing illustrates a hot water storage tank 1 which receives cold water through supply pipe 2 and which is connected with water heater 4 in the furnace 6 by pipes 3; thermo-siphonic circulation of the water through tank 1, pipes 3 and heater 4 serving to maintain a supply of heated water within storage tank 1. The tank is preferably jacketed with any suitable heat insulating material, as designated by numeral 15. A suitable outlet 25 is connected to the storage tank and permits withdrawal of water for household use whenever desired.

The temperature regulating device, which more particularly forms the subject matter of the present invention, may be used in conjunction with a conventional water heating system of this character and preferably is located at the top of the tank 1, although it may be located adjoining other portions of the system, if desired. The device comprises a container 7 which is located within the tank and provided with exterior heat-conducting fins 8 for facilitating the transfer of heat from the water stored in the tank to liquid within container 7. Preferably the container is filled with a suitable liquid 14 which extends nearly to the top thereof. The upper end of the container is connected with a pipe 12 of comparatively small cross section and considerable length, which extends outside of the tank 1. This pipe comprises a condenser section 9 which is provided with a series of cooling fins 10 to facilitate the transfer of heat from vapor within the pipe to the atmosphere.

The outer end of the pipe 12 terminates in a closed chamber 11, the capacity of which is several times and preferably many times the volume of the passage 12 plus the air space above the liquid in container 7. This container is provided with a normally closed opening 35, through which the gaseous pressure in the system may be raised or lowered by means of any suitable apparatus. The container 7 is nearly filled with a liquid, the boiling point of which at the pressure within the system is only slightly lower than the temperature above which it is desired to prevent the water in the storage tank from rising. The remainder of the temperature regulating device, namely the pipe 12, and chamber 11, are filled with any suitable fixed gas at any desired pressure in order to permit boiling of the liquid in container 7 at the desired temperature. For example, alcohol may be located within the container 7 and air at atmospheric pressure may be contained within pipe 12 and chamber 11.

The operation of the system is as follows:

While the temperature of the water in tank 1 is below the boiling point of the liquid in container 7 at the pressure existing therein, insulation of tank 1 prevents unnecessary waste of heat or undesirable heating of the air within the room. Under these conditions loss of heat through the temperature regulating device is limited to the direct conduction of heat along the wall of pipe 12 and to the slight diffusion of vapor from liquid 14 through the gas with which the device is filled. In the case of most liquid and gases this rate of diffusion is so low as to be practically negligible. Assume, however, that the temperature of the water in tank 1 rises so that it is at or slightly above the boiling point of the liquid in tank 7. The temperature of the water within the tank is then high enough to cause sufficient heat conduction through fins 8 to raise the temperature of liquid 14 above its boiling point and the liquid boils. As a result, air is forced out of container 7 and the adjoining part of pipe 12 sufficiently to permit the condensation in pipe 12 of a suitable unit of vapor (evaporated from the liquid 14) to dissipate to the air, or other medium surrounding pipe 12, the heat which is being transferred to liquid 14 from the water in tank 1.

As the temperature of liquid in tank 1 becomes higher, liquid 14 boils more rapidly and the vapor occupies an additional length of pipe 12 so that a larger number of fins 10 are dissipating heat. In the meantime, due to the comparatively large capacity of chamber 11, the gaseous pressure within the temperature regulating device has not materially risen, and therefore the boiling point of liquid 14 has not become materially higher so that the rate of boiling within tank 7 continues to be substantially proportional to the amount of heat which is to be dissipated by the system, and the extent of the pipe 12 which is filled with condensing vapor is also substantially proportional to the amount of heat which is to be dissipated. Preferably the capacity of condenser section 9 is sufficient to dissipate the maximum amount of heat that can be imparted to the system from the heat source 6, so that, even under these conditions, the volume of the gas is not reduced below the volumetric capacity of chamber 11 and the gaseous pressure is only slightly raised. Thus the temperature of the liquid within tank 1 may be automatically regulated so that practically no heat is dissipated by the temperature regulating device until the temperature of that liquid has risen to a point slightly higher than the boiling point of the liquid in container 7, and thereafter a large additional input of heat is dissipated by the condenser section 9 and its fins 10 without permitting the temperature of the water within the storage system to rise materially above the initial point at which heat dissipation began.

It will be evident that the small cross sectional area of the duct 12 and particularly of that part thereof which adjoins gas reservoir 11, permits only a slight diffusion or intermingling of the vapor with the gas near the inlet of the reservoir, this minute quantity of vapor in the meantime losing its heat so that the temperature of the gas within the reservoir remains practically the same despite the dissipation of a large amount of heat by the elongate passage. Since the temperature of this body of gas remains substantially constant and since the volume of gas within the system is not materially reduced, the pressure of the gas contained within the system is not materially raised, and the boiling point of the liquid remains substantially fixed.

Obviously the gaseous pressure within the temperature regulating device may be changed or the liquid which is contained within the same may be varied in order to change the predetermined maximum point above which the temperature of the water in the tank will not be permitted to pass; for example, other liquids may be mixed with or substituted for alcohol in container 7 or a soluble solid may be mixed with the liquid to raise its boiling point.

From the foregoing it will be evident that the gas pressure in the chamber 11 and duct 12 is such that the boiling point of the liquid 14 in container 7 is intermediate the limits of the normal temperature range of the liquid in tank 1 and is preferably at or near the upper limit of this range, whereby substantially no heat is dissipated throughout that portion of the range below said point but when said point is reached or passed rapid dissipation takes place; whereas if the pressure in chamber 11 and duct 12 were so low that the liquid 14 would boil near or below the lower limit of the normal temperature range of the contents of tank 1, then rapid heat loss would take place throughout the entire temperature range of the contents of tank 1. Thus the present invention involves a temperature controller which is normally inactive and which automatically functions only under abnormal conditions, in contradistinction to a heat dissipator which has no selective action.

By suitably adjusting the air (or other gas) pressure in chamber 11 and duct 12 any liquid may be caused to boil at the maximum temperature desired in tank 1, but by using a liquid 14 which, at atmospheric pressure, begins to boil at the desired maximum, the air pressure in chamber 11 may be atmospheric, which has the advantage of minimizing leakage and of rendering slight leakage inconsequential.

While the present invention has been disclosed more particularly in connection with a hot water storage system for household use, it is obvious that the temperature regulating device is applicable to a wide variety of installations wherein it is desirable to dissipate heat in order to prevent the temperature of a given body or medium from rising above a predetermined maximum temperature and wherein it is undesirable or impractical to interrupt the input of heat to said medium.

I claim:

1. Apparatus for limiting the maximum temperature of a body comprising a chamber in heat-transfer relation to the body, the chamber containing liquid having a boiling point approximating said maximum temperature so as rapidly to evolve vapor when the temperature of said body reaches the maximum temperature, a conduit leading from the chamber to a gas reservoir, the conduit being arranged to dissipate heat throughout a substantial portion of its length, whereby said vapor is condensed and returned by gravity to said chamber, and gas in said reservoir and conduit at a pressure substantially to restrict said vapor to a portion of the conduit throughout a range of vapor pressures, whereby the height to which the vapor rises in said conduit, and therefore the rate of heat dissipation, varies in accordance with the temperature of said body.

2. Apparatus for limiting the maximum temperature of a body comprising a chamber in heat-transfer relation to the body, the chamber containing liquid having a boiling point approximating said maximum temperature so as rapidly to evolve vapor when the temperature of said body reaches the maximum temperature, a conduit leading upwardly from the chamber to a confined gas space, the conduit being arranged to dissipate heat throughout a substantial length of its upwardly rising portion, whereby said vapor is condensed and returned by gravity through said conduit to said chamber, and gas in said space at a pressure substantially to restrict said vapor to said portion of the conduit throughout a range of vapor pressures, whereby the height to which the vapor rises in said conduit, and therefore the rate of heat dissipation, varies in accordance with the temperature of said body, the volume of said space being large relative to the volume of said duct so that variations in the height of vapor in said duct has little effect on the pressure in the space and therefore little effect on the boiling point of said liquid.

3. Apparatus for limiting the maximum temperature of a body comprising a chamber in heat-transfer relation to the body, the chamber containing liquid having a boiling point approximating said maximum temperature so as rapidly to evolve vapor when the temperature of said body reaches the maximum temperature, a gas reservoir, means interconnecting said chamber and reservoir whereby vapor from the liquid in said chamber may compress said gas and, when condensed, return to said chamber, said means comprising a conduit leading from the chamber to the reservoir and arranged to dissipate heat throughout a substantial portion of its length, the conduit constituting the sole connection to said reservoir and being small in cross-section adjoining the reservoir thereby to obstruct the passage of vapor into the reservoir except by diffusion through the gas therein, whereby the distance to which the column of vapor advances in said conduit, and therefore the rate of heat dissipation varies in accordance with the temperature of said body.

4. A temperature control device to limit the temperature of a body to a predetermined maximum, said device comprising a closed system, one part of said system being in heat transfer relation to the body, the temperature of which is to be controlled, a liquid in said part of the system, a gas filling the remainder of the system, said gas being at a pressure to permit boiling of the liquid at a temperature near the desired maximum temperature of the body, heat dissipating means provided by that part of the system which does not contain the liquid, said dissipating means being located between the surface of evaporation of the liquid and a portion of the gas-containing part of the system, whereby increase in the temperature of the body to a point approaching the predetermined maximum will cause boiling of the liquid and dissipation of heat from the vapor of the same through the heat dissipating means, said heat dissipating means having sufficient capacity to cause condensing of all the vapor generated before an appreciable part of the vapor may reach that portion of the gas-containing part of the system which is spaced farthest from the liquid-containing part of the system.

5. A temperature control device to prevent the temperature of a body from exceeding a predetermined maximum, said device comprising a closed system, a liquid container having heat conductive elements in heat transfer relation to the body, the temperature of which is to be controlled, a liquid in said container, a gas filling the remainder of the system, said gas being at a pressure to permit boiling of the liquid at a temperature near the desired maximum temperature of the body, said system including a comparatively elongate passage of comparatively small cross section to permit heat dissipation, and a gas-containing reservoir, said passage interconnecting said container and said reservoir, whereby increase in the temperature of the body to a point approaching the predetermined maximum will cause boiling of the liquid and dissipation of heat from the vapor of the same through the heat dissipating means.

6. A temperature control device to limit the temperature of a body to a predetermined maximum, said device comprising a closed system including a lower liquid container in heat transfer relation to the body, the temperature of which is to be controlled, a liquid in the container, a gas filling the remainder of the system, said gas being at a pressure to permit boiling of the liquid at a temperature near the desired maximum temperature of the body, said system including a comparatively elongate passage of comparatively small cross section to permit heat dissipation, said passage being connected to said container, heat dissipating fins surrounding said passage, said dissipating fins being located between the surface of evaporation of the liquid-containing part and a portion of the gas-containing part of the system, whereby increase in the temperature of the body to a point approaching the predetermined maximum will cause boiling of the liquid and dissipation of heat from the vapor of the same through the heat dissipating fins to the atmosphere, said fins having sufficient capacity to cause condensing of all the vapor generated before an appreciable part of the vapor may reach that portion of the gas-containing part of the system which is spaced farthest from the liquid-containing part of the system.

7. A temperature control device to limit the temperature of a body to a predetermined maximum, said device comprising a closed system including a liquid container in heat transfer relation to the body, the temperature of which is to be controlled, a liquid in said container, a gas filling the remainder of the system, said gas being at a pressure to permit boiling of the liquid at a temperature near the desired maximum temperature of the body, said system comprising heat dissipating means adjoining the liquid container, said dissipating means being located between the surface of evaporation of the liquid in the container and a portion of the gas-containing part of the system, the portion which includes the heat dissipating means having a small volumetric capacity compared to the remainder of the system which is occupied by the gas, the cooling capacity of the heat dissipating means being sufficient to condense substantially all of the vapor produced before it can pass to the part of the system containing the greater portion of the gas, whereby heating of the body to a temperature approaching the predetermined maximum will cause boiling of the liquid and dissipation of the heat from the vapor of the same through the heat dissipating means and whereby further heating of the body will not materially raise the boiling point of the liquid so that no further material rise in the body temperature occurs.

8. A temperature regulating device to limit the temperature of a body to a predetermined maximum, said device comprising a closed system, the lower part of said system being in heat transfer relation to the body, the temperature of which is to be regulated, a liquid in said lower part of the system, a gas filling the remainder of the system, said gas being at a pressure to permit boiling of the liquid at a tempearture near the desired maximum temperature of the body, said system including a comparatively elongate passage of comparatively small cross section, heat dissipating means associated with said passage, said dissipating means being located between the surface of evaporation of the liquid and a portion of the gas-containing part of the system, said passage normally containing a comparatively small portion of the gas within the system, the cooling capacity of the heat dissipating means upon said elongate passage being sufficient to condense substantially all of the vapor produced before it can pass to the part of the system containing the greater portion of the gas, whereby heating of the body to a temperature approaching the predetermined maximum will cause boiling of the liquid and dissipation of heat from the vapor of the same through the heat dissipating means and whereby further heating of the body will not materially raise the boiling point of the liquid so that no further material rise in the body temperature occurs.

9. A temperature control device to limit the temperature of a body to a predetermined maximum, said device comprising a closed system, the lower part of said system being in heat transfer relation to the body, the temperature of which is to be controlled, a liquid in said lower part of the system, a gas filling the remainder of the system, said gas being at a pressure to permit boiling of the liquid at a temperature near the desired maximum temperature of the body, said system including a comparatively elongate passage of comparatively small cross section to permit heat dissipation, said passage being located between the surface of evaporation of the liquid and a portion of the gas-containing part of the system, heat dissipating means associated with said passage, said passage terminating in a gas-containing chamber, said chamber having a large volumetric capacity compared to that of the remainder of the system which is filled with gas, the cooling capacity of the heat dissipating means upon said elongate passage being sufficient to condense substantially all of the vapor produced before it can pass to the part of the system containing the greater portion of the gas, whereby heating of the body to a temperature approaching the predetermined maximum will cause boiling of the liquid and dissipation of heat from the vapor of the same through the heat dissipating means and whereby further heating of the body will not materially raise the boiling point of the liquid so that no further material rise in the body temperature occurs.

Signed by me at Boston, Massachusetts, this 18th day of February, 1927.

LYMAN F. WHITNEY.